UNITED STATES PATENT OFFICE.

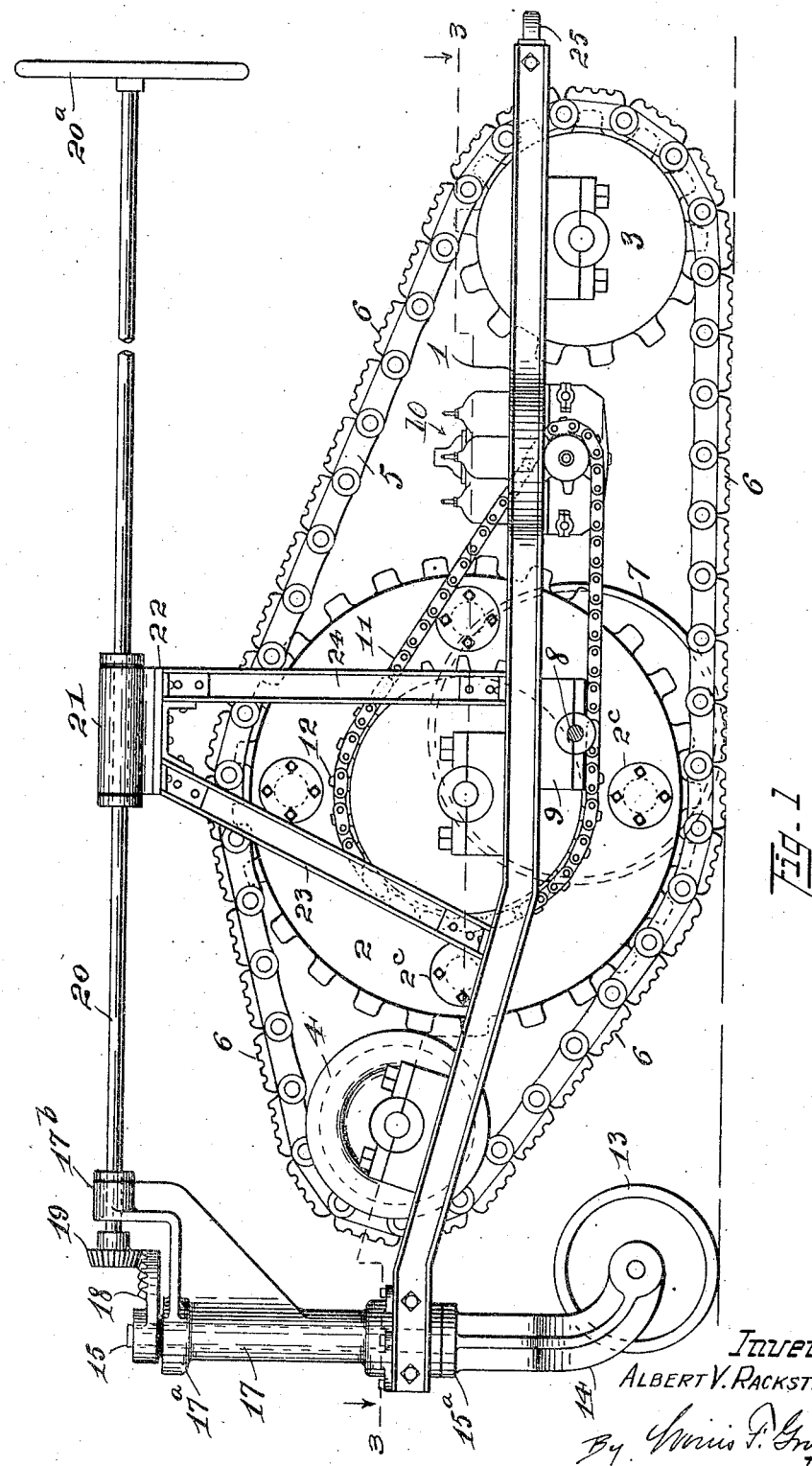

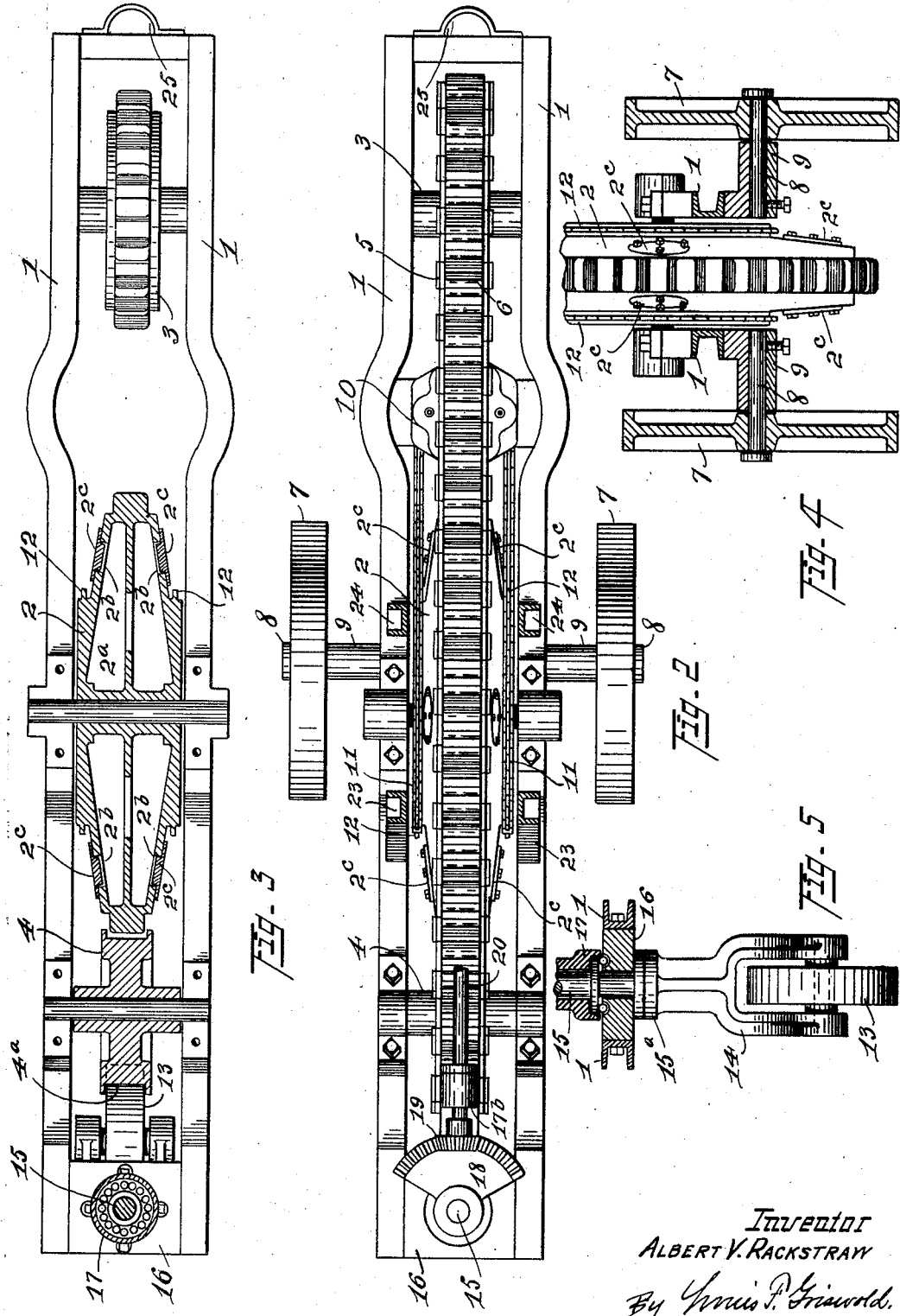

ALBERT V. RACKSTRAW, OF BEDFORD, OHIO.

TRACTOR.

1,292,047.        Specification of Letters Patent.        Patented Jan. 21, 1919.

Application filed January 3, 1918. Serial No. 210,116.

*To all whom it may concern:*

Be it known that I, ALBERT V. RACKSTRAW, a subject of the King of Great Britain, residing at Bedford, in the county of Cuyahoga and State of Ohio, have invented certain new and useful Improvements in Tractors, of which the following is a specification.

This invention relates to tractors of the crawler or so-called caterpillar type used on farms for hauling, plowing, cultivating, ditching, and farm work in general. The objects of the present invention are.—Primarily, to provide a machine of the character specified, that can be built at comparatively low cost; that is contracted laterally or of small extent in its side to side dimension, thereby making it particularly efficient for cultivating.

The nature of the soil is an important factor to be considered in the operation of a farm tractor. It is obvious that if the ground is hard and smooth a heavy machine will work to advantage, while if a soft or marshy condition exists, better results are obtained with a lighter machine. Therefore a further object of the invention is the provision of means for readily altering the weight of the tractor, or in other words, providing for adjustable ballast, thereby accommodating the machine to varying conditions of soil. Still a further object is to provide a tractor adapted to be coupled with any one of the ordinary farming implements, and operated by the same individual that attends to the functions of the connected implement.

With these and other apparent objects in view the invention consists in the combination and arrangement of a series of driven sprocket and traction wheels mounted tandem on a frame and operating an endless sprocket crawler, the master driving sprocket wheel being hollow to adapt it to the accommodation of a quantity of liquid, that may be increased or decreased for regulating the ballast of the machine.

To facilitate the explanation of the invention reference will be had to the accompanying drawings which are made a part of the specification, and in which similar characters of reference are employed to designate corresponding parts.

In the said drawings Figure 1 is a side elevation of an embodiment of the improved tractor, the motor being shown more or less diagrammatic, and the near side out-board supporting wheel being removed.

Fig. 2 is a top plan view with certain parts broken away.

Fig. 3 is a longitudinal section substantially on line 3—3, Fig. 1, with the out-board supporting wheels and bearings removed, and the motor and caterpillar tread eliminated.

Fig. 4 is a fragmentary vertical section through the supporting wheels and bearings, showing their connection with the frame.

Fig. 5 is a fragmentary vertical section of the steering means.

In the drawings I have illustrated an embodiment that carries out the principal aim of the present invention, which is to provide an economical, serviceable tractor having a narrow base and adjustable ballast means. Motive power, steering mechanism, and other details of construction are necessary adjuncts to the operation of this tractor, and as certain of these elements are common to all tractors, I only claim them broadly in combination with the elements that enter into the construction and arrangement of the improved machine.

Referring now to the drawings, 1 designates the side bars of a frame designed to support the operating elements, substantially in the relative position shown. 2 and 3 are sprocket wheels, and 4 is a traction wheel or idler. These wheels are mounted tandem in suitable bearings provided therefor on the side bars 1, and are adapted to rotate in alinement between the said bars. For convenience of explanation the wheel 2 will be designated as the master-sprocket, and the wheel 3 as the trailer. The trailer is preferably of smaller diameter than the master-sprocket, and is mounted lower on the horizontal portion of the frame so that the tangent line of the lowest points of the peripheries of the two wheels is in a plane parallel to the horizontal portion of the frame. The wheel 4 is mounted on the frame in bearings located above the plane of the master-sprocket bearings, and is of comparatively small diameter.

An endless sprocket chain 5, provided with gripping pads 6 is carried by the wheels 2, 3, and 4, said chain being in mesh with the teeth of the wheels 2 and 3 and rolling in the channel 4$^a$ of the wheel 4. It will be noted that the general contour of the chain structure, when in operative position, as shown in Fig. 1, is similar to the contour of the powerful tank cars used for war purposes. This peculiar type provides a long tread and an upward inclined forward portion, which adapts the tractor to readily surmount obstacles.

The master-sprocket 2 is provided with a chamber 2ª adapted to contain water in more or less quantities for ballast, means being provided for charging and discharging. In the embodiment as shown, the member 2 is a hollow integral casting provided with openings 2ᵇ. These openings provide for the discharge of the core used in molding the member, and also may be used for the entrance and discharge of liquid ballast, water-tight closure members 2ᶜ being provided.

Out-board supporting wheels 7 are provided for stabilizing or maintaining the machine in an upright position. These wheels 7 are mounted on trunnions 8 which are made fast in brackets 9 attached to the underside of the side bars 1. With the provision of the supporting wheels 7 extending from both sides of the machine the operating parts may be confined in a narrow lateral space, and a single caterpillar crawler, which lays its own track, may be employed. It will be evident to those familiar with farming that this construction is advantageous when using the tractor in connection with cultivators or other farm implements.

There are numerous types of motors that may be adapted to drive the improved tractor, and therefore, the motive power is considered only in a broad sense as a part of the invention. The location of the motor however is a salient factor in the efficiency of the tractor. In the embodiment as illustrated, 10 represents a motor mounted on the frame between the master-sprocket 2 and the trailer 3. This is obviously the proper location, as it puts the weight of the motor where it is utilized to advantage in the operation of the machine.

The master-sprocket 2 is driven from the motor by twin sprocket chains 11, co-acting with sprockets 12, which are integral with or rigidly attached to the master wheel 2.

While I have shown, and presently will describe an operative means for steering the improved tractor, I anticipate the employment of mechanism differing in details of construction and coöperative arrangement from that shown, and therefore I wish it to be understood that I am not confined to the construction as specified.

The steering mechanism of the present embodiment includes a pilot-wheel 13 mounted in a yoke 14 which is provided with a stem 15 and a shoulder 15ª. A head block 16 is bolted to the side bars 1, and has an upwardly extending, centrally cored bracket 17 attached thereto. The stem 15 extends through the bore of the bracket 17 which is preferably provided with upper ball bearings at 17ª, lower similar bearings being provided in the head block, as best shown at 16ª Fig. 5. Attached to the upper terminal of the stem 15 is a segmental gear member 18 which is adapted to mesh with a pinion 19 keyed or otherwise made fast to a steering rod 20. The steering rod 20 is journaled in a bearing 17ª provided on the bracket 17, and extends rearward over the tractor in the vertical plane of the medial line of the machine. A second bearing 21 is provided for the rod 20. The bearing 21 is attached to a plate 22, which is connected to upright frame members 23 and 24 connected with the side bars 1.

The steering rod 20 is provided with an actuating wheel 20ª located at a point convenient for manipulation by the operator of the plow, cultivator, ditching machine or other implement or vehicle to be towed by the tractor. Means 25 are provided for connection of the auxiliary vehicle or implement.

This novel construction provides a tractor that can be built at extremely low cost; that can be ballasted so as to operate with uniform efficiency on different soil or road conditions, and that is serviceable and highly efficient for farm purposes in general.

What I claim and desire to secure by Letters Patent is.

1. A tractor including one master-sprocket wheel, one auxiliary sprocket wheel and an idler wheel, a frame on which said wheels are mounted in tandem alinement, an endless sprocket crawler member engaging the teeth of the sprocket wheels and the periphery of the idler wheel, means for driving the master-sprocket wheel, and means for guiding the machine.

2. A tractor including a master-sprocket wheel provided with a liquid chamber and means for charging and discharging said chamber; an auxiliary sprocket wheel and an idler wheel, a frame on which said wheels are mounted in tandem alinement, an endless sprocket crawler member engaging the teeth of the sprocket wheels and the periphery of the idler wheel, means for driving the master wheel, and means for guiding the machine.

3. In a tractor the combination of a frame; a master-sprocket wheel mounted on said frame; an auxiliary sprocket wheel of smaller diameter than the master wheel, mounted on the frame to the rearward and in a lower plane that said master wheel; an idler wheel mounted on the frame forward of and in a plane above the master wheel bearings, all three wheels named being in tandem alinement; an endless sprocket crawler member engaging the teeth of the sprocket wheels and the periphery of the idler wheel; and means for driving the master wheel.

4. In a tractor the combination of a frame; a master-sprocket wheel mounted on said frame; a liquid chamber within said master-sprocket wheel; means for charging and discharging said chamber; an auxiliary sprocket wheel of smaller diameter than the master wheel, mounted on the frame to the rearward and in a lower plane than said master wheel; an idler wheel mounted on the frame forward of and in a plane above the master wheel bearings, all three wheels named being in tandem alinement; an endless sprocket crawler member engaging the teeth of the sprocket wheels and the periphery of the idler wheel; and means for driving the master wheel.

5. In a tractor the combination of a frame; a master-sprocket wheel mounted on said frame; adjustable ballast means connected with said master-sprocket wheel; an auxiliary sprocket wheel of smaller diameter than the master wheel, mounted on the frame to the rearward and in a lower plane than said master wheel; an idler wheel mounted on the frame forward of and in a plane above the master wheel bearings, all three wheels named being in tandem alinement; an endless sprocket crawler member engaging the teeth of the sprocket wheels and the periphery of the idler wheel; and means for driving the master wheel.

6. In a tractor the combination of a frame; a master-sprocket wheel mounted on said frame; an auxiliary sprocket wheel of smaller diameter than the master wheel, mounted on the frame to the rearward and in a plane lower than that of said master wheel; an idler wheel mounted on the frame forward of and in a plane above the master wheel bearings, all three wheels named being in tandem alinement; an endless sprocket crawler member engaging the teeth of the sprocket wheels and the periphery of the idler wheel; a motor mounted on the frame between the two sprocket wheels; driving means from said motor to the master sprocket wheel; and means for steering the tractor.

In testimony whereof I affix my signature.

ALBERT V. RACKSTRAW